(12) United States Patent
Kalaichelvan et al.

(10) Patent No.: US 11,880,713 B2
(45) Date of Patent: Jan. 23, 2024

(54) METHOD AND APPARATUS FOR OPTIMIZATION OF CRYPTOGRAPHIC RESOURCE USAGE

(71) Applicant: ARRIS Enterprises LLC, Suwanee, GA (US)

(72) Inventors: Kaliraj Kalaichelvan, San Diego, CA (US); Bill Franks, San Diego, CA (US); Suresh Kumar Reddy Throtti, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 540 days.

(21) Appl. No.: 17/118,356

(22) Filed: Dec. 10, 2020

(65) Prior Publication Data

US 2021/0208940 A1    Jul. 8, 2021

Related U.S. Application Data

(60) Provisional application No. 62/946,408, filed on Dec. 10, 2019.

(51) Int. Cl.
*G06F 9/50* (2006.01)
*H04L 9/08* (2006.01)

(52) U.S. Cl.
CPC ............ *G06F 9/5022* (2013.01); *H04L 9/085* (2013.01); *H04L 9/0838* (2013.01); *H04L 9/0861* (2013.01)

(58) Field of Classification Search
CPC ...................................................... G06F 9/5022
See application file for complete search history.

(56) References Cited

U.S. PATENT DOCUMENTS

| | | | | |
|---|---|---|---|---|
| 2017/0083724 A1* | 3/2017 | Chhabra | ............... | H04L 9/3242 |
| 2018/0262348 A1* | 9/2018 | Golshan | ............... | H04L 9/0838 |
| 2021/0044503 A1* | 2/2021 | Zhang | ............... | H04L 41/5025 |
| 2022/0138286 A1* | 5/2022 | Zage | ............... | G06F 21/602 |
| | | | | 726/26 |

* cited by examiner

*Primary Examiner* — Sisley N Kim
(74) *Attorney, Agent, or Firm* — Chernoff, Vilhauer, McClung & Stenzel, LLP

(57) ABSTRACT

A method to optimize the usage of these crypto resources for effectively sharing the resource with identical configuration crypto material and thereby reducing the operation overhead associated with cryptographic operations is disclosed.

20 Claims, 10 Drawing Sheets

METHOD AND APPARATUS FOR OPTIMIZATION OF CRYPTOGRAPHIC RESOURCE USAGE

CROSS-REFERENCE TO RELATED APPLICATIONS

This application claims benefit of U.S. Provisional Patent Application No. 62/946,408, entitled "METHOD AND APPARATUS TO OPTIMIZE CRYPTO RESOURCE USAGE IN STB FOR EFFICIENCY AND REDUCE TIME," by Kaliraj Kalaichelvan, Bill Franks and Richard Rementilla, filed Dec. 10, 2019, which application is hereby incorporated by reference herein.

BACKGROUND

1. Field

The present disclosure relates to systems and methods for performing cryptographic operations to encode and decode information, and in particular to a system and method for optimizing processor cryptographic resources.

2. Description of the Related Art

Set-top boxes (STBs) are devices for receiving media content from remote sources within a content distribution system (CDS). To prevent unauthorized reception and/or consumption of content, a typical CDS uses one or more Digital Rights Management (DRM) schemas to protect high value audio video content for distribution and playback. These DRM schemas employ the usage of cryptographic (crypto) resources in STBs to secure the media content. Such crypto resources are typically implemented in a separate secure processor used in the STB for sensitive operations.

The crypto resources are typically used for several security operations including, key material handling, key derivation and handling, encryption, decryption, authentication and access right determination. These operations may also include communication with DRM managers residing in the STB and/or at a remote cloud. Such crypto resources are typically invoked in normal STB operations. For example, if a user is channel surfing or otherwise changing from one channel transmitting first media content to another channel transmitting second media content, it is typically required to use a different key or different decryption algorithm to decrypt the content from the selected channel. Further, this must be performed rapidly, or the viewer's channel-surfing ability will be severely compromised.

Such crypto resources could be limited in quantity and their limited availability to service multiple operations can introduce significant operation overhead, including overhead related to setting up and initializing cryptographic operations. Furthermore, even in embodiments wherein the secure processor of the STB includes sufficient crypto resources, such resources are typically available for use only according to a license granted by the provider of the chip employed in the secure processor. Such licenses can be costly, and it is therefore advantageous to reduce the use of such crypto resources as much as possible without negatively affecting performance. Accordingly, what is needed is a system and method for effectively sharing such crypto resources among multiple sessions within an STB.

SUMMARY

To address the requirements described above, this document discloses a system and method for optimizing an allocation of R of cryptographic resources to a plurality of sessions, each of the R cryptographic resources shareable by no more than N sessions, wherein N>R, and each of the R cryptographic resources being characterized by one of an idle state, a running state and a dirty state. In one embodiment, the method comprises receiving a request from one of the plurality of sessions to use one of the R cryptographic resources and determining if any of the R cryptographic resources is in the running state and sharable by the requesting session. If any of the R cryptographic resources is in the running state and sharable by the requesting session, that one of the R cryptographic resources in the running state is allocated to the requesting session, but if none of R cryptographic resources is in the running state and sharable by the requesting session, another one of the R cryptographic resources is allocated to the requesting session. Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

Figure 1:
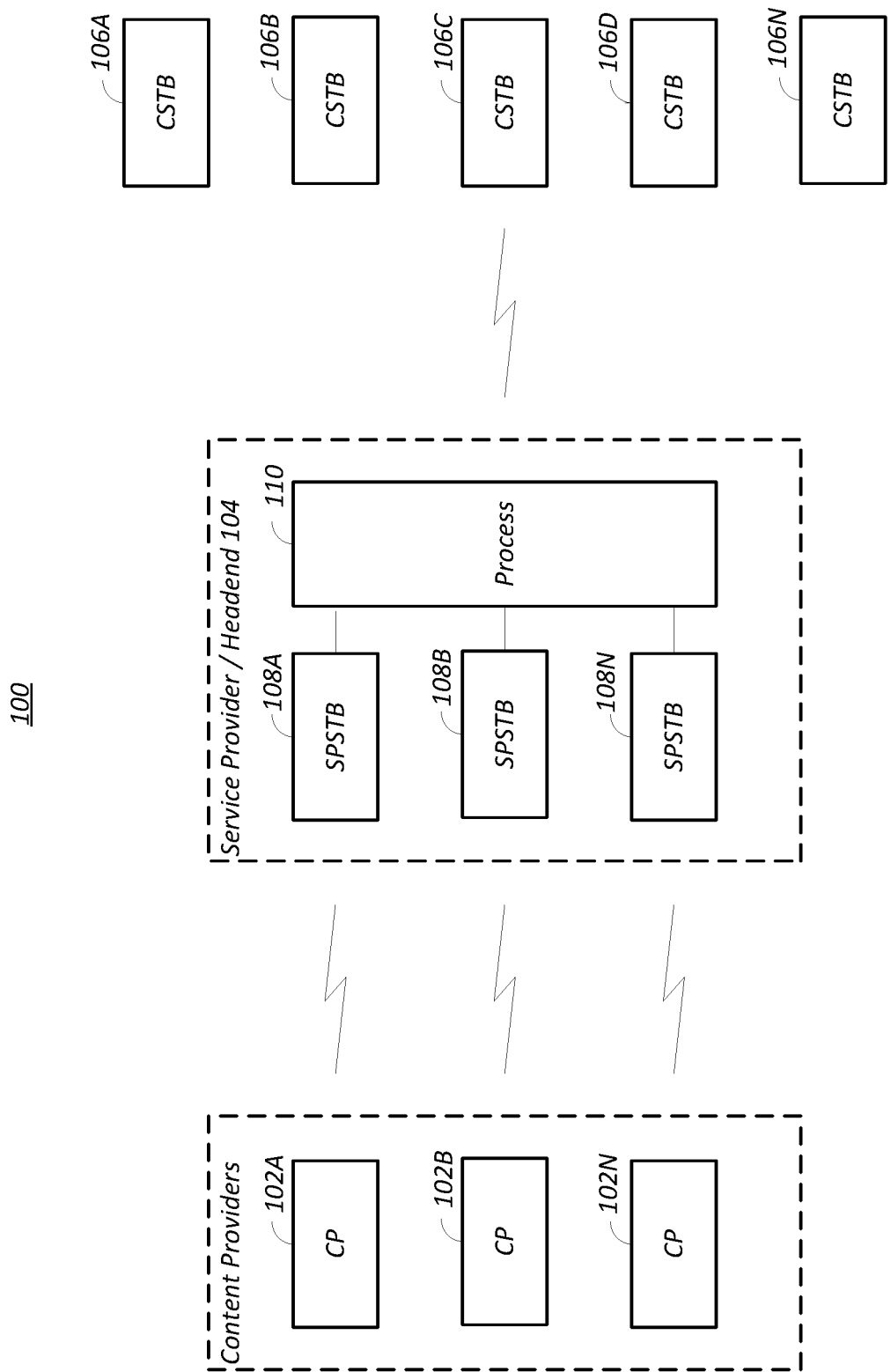
FIG. 1 FIG. 1 is a diagram of a typical content distribution system.

In the following description, reference is made to the accompanying drawings which form a part hereof, and which is shown, by way of illustration, several embodiments. It is understood that other embodiments may be utilized and structural changes may be made without departing from the scope of the present disclosure.

Overview

A method to optimize the usage of these crypto resources for effectively sharing the resource with identical configuration crypto material and thereby reducing the operation overhead associated with cryptographic operations is described below. In this context, a crypto resource is broadly defined to include any resource (processing, memory or key slot) used to perform a cryptographic operation, but may be more narrowly defined as a combination of a key slot (a memory location where information is provided and used by cryptographic operations to generate a key to decrypt content or other information), and secure memory and business logic associated with the management of that key slot.

The method applies to handling a first number (R) of available crypto resources, each of which can be shared by a second number (N) crypto sessions. Each of the N crypto sessions execute standalone crypto operations serially (e.g. completing one crypto operation before beginning the next).

Since the operations occur serially, it is possible for operations to use a crypto resource will be delayed because the system is cleaning up and preparing another crypto resource. The techniques described below defer the clean-up and preparation of crypto resources until a time when such operations can be performed without unnecessary delays. The technique relies on the assumption that the number of crypto resources exceeds the number of crypto sessions, or R>N.

The technique defines three crypto resource usage states, namely:
DIRTY=Resource requires a cleanup to enter the idle state;
IDLE=Resource is clean, but stopped and requires setup to enter the running state;
RUNNING=Resource is ready for use;

The technique tracks the usage of each crypto resource to determine which of the resources are ready for usage, idle, or dirty. Idle resources which requires a start before being used, and dirty resources must be cleaned up and then started before use. Every crypto resource tracks which sessions are sharing the crypto block of memory, and a crypto resource is not released unless all sessions sharing that resource either affirmatively relinquish the crypto resource or when the usage pattern of all sessions using that crypto resource indicate that the resource is no longer needed by those sessions for the foreseeable future. The method guarantees at least one crypto resource will be available for configuring within a crypto interval when new sessions are setup. The technique optimizes crypto resource usage by sharing such resources when possible, optimizes crypto resource cleanup by deferring such cleanup until it can be accomplished without impacting new session request, and optimizes when crypto resources are started up for use.

Content Distribution System

FIG. 1 is a diagram of a typical content distribution system (CDS) 100. The CDS comprises one or more content providers 102A-102C (hereinafter alternatively referred to as content provider(s) 102), each transmitting one or more media programs or other content to one or more service providers 104 (also referred to as a headend). Such transmission can be accomplished via satellite, cable, or a suitable Internet connection. Each headend 104 has a plurality of service provider set top boxes (STBs) 108A-108N hereinafter referred to as service provider STBs 108), each of which receive content from a respective one of the content providers 102. The content received by the SPSTBs 108 is processed by processor 110 to generate one or more data streams that are transmitted to client set top boxes (CSTBs) 106A-106N (hereinafter referred to as CSTB(s) 106). Such transmission can also be accomplished by any means of suitable bandwidth, including satellite, cable, or a suitable internet connection.

Figure 2:
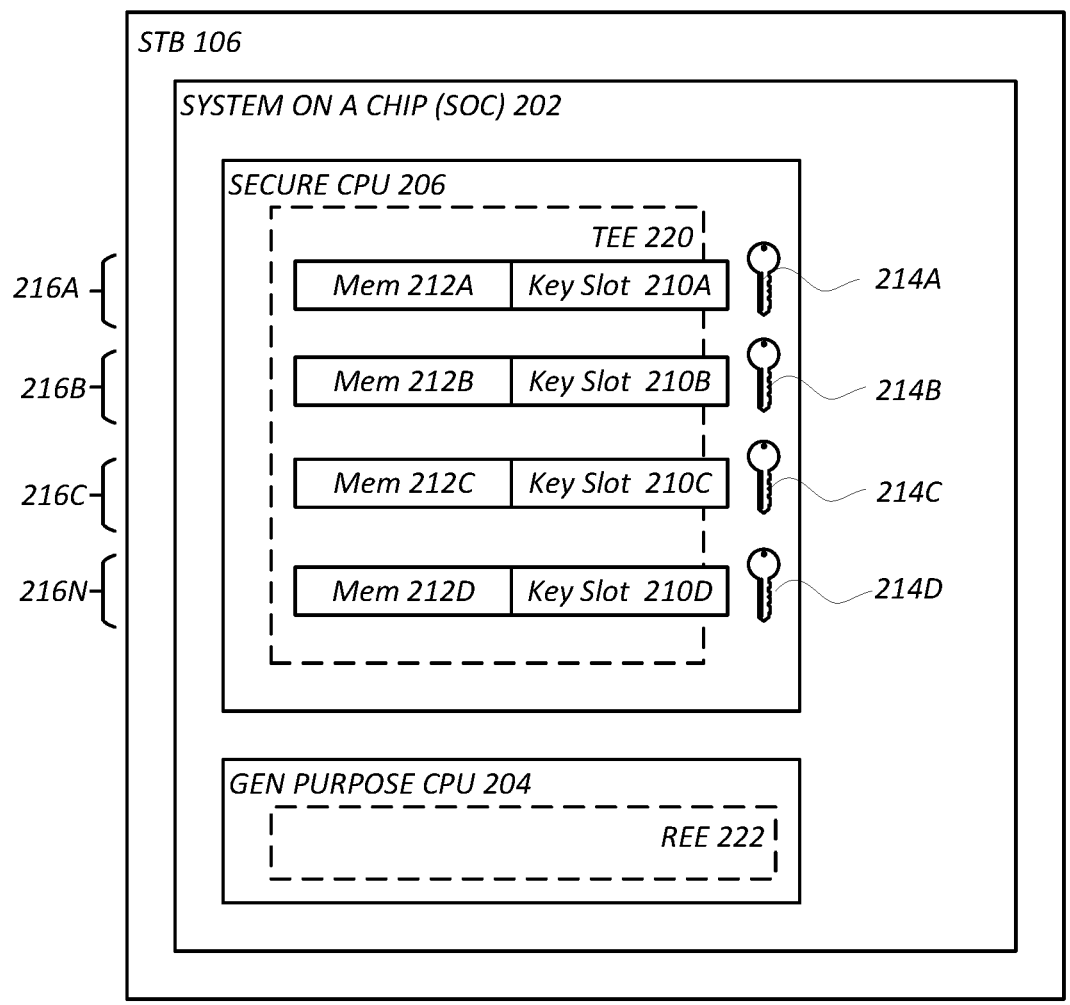
FIG. 2 is a diagram illustrating one embodiment of a set top box.

FIG. 2 is a diagram illustrating one embodiment of a SPSTB 108 or CSTB 106. For purposes of this disclosure, the functions of the SPSTBs 108 and the CSTBs 106 are analogous, and will be discussed with reference to CSTBs 106, which will hereinafter be referred to simply as STBs 106.

The STB 106 comprises a system-on-chip (SOC). The SOC 202 includes a secure CPU 206, with the SOC 202 having a secure CPU 206. The secure CPU 206 implements a trusted execution environment (TEE) 220. DRM and security-related operations are performed in the TEE 220 of the STB 106. The TEE 220 implements one or more key slots 210A-210N (hereinafter alternatively referred to as key slot(s) 210). Key slots are an artifice which accepts key generation information 214A-214N from which the keys required to decrypt information are derived in the TEE 220 by cryptographic algorithms. Each key slot 210 is associated with a portion of memory 212A-212N of the TEE 220 for storing data related to computing the keys from the key generation information 214. Instructions for managing the accepting and use of the key data to generate the keys and for managing use of the key slots 210 is stored elsewhere in a memory of the secure CPU 206. Hereinafter, such instructions are referred to as business logic. The business logic, memory 212 and key slots 210 together comprise a number of what are referred to hereinafter as cryptographic (or crypto) resources 216A-216N. In one embodiment, the keys computed by the TEE from the key generation information 214 comprise keys in a key ladder based on a tamper proof root key, which may be implemented in hardware or software.

The SOC 202 also comprises a general purpose host processor 204 (alternatively referred to hereinafter as a host processor or host CPU 204). The host CPU 204 also includes a communicatively coupled general purpose processor memory storing instructions for performing secure operations. The host CPU 204 implements a Rich Execution Environment (REE) 222. DRM systems are implemented at least in part using trusted applications (TAs) executed using the TEE of the device 106 implemented by the secure CPU 206 of the device, and may also be implemented at least in part by applications executed using the host CPU 204.

Optimization of Crypto Resource Usage

One aspect of the optimization of the use of cryptographic resources involves allocating new sessions to running and sharable cryptographic resources when possible. This is accomplished by tracking the use of identical crypto material (key generation information 214) across sessions to allow sharing the same crypto resource 216 with N sessions to reduce the usage of dedicated resources per session. This not only optimizes crypto resource 216 usage but also eliminates the overhead of setting up and configuring a dedicated crypto resource 216 for every session. The method prioritizes RUNNING resources for usage selection.

Figure 3A:
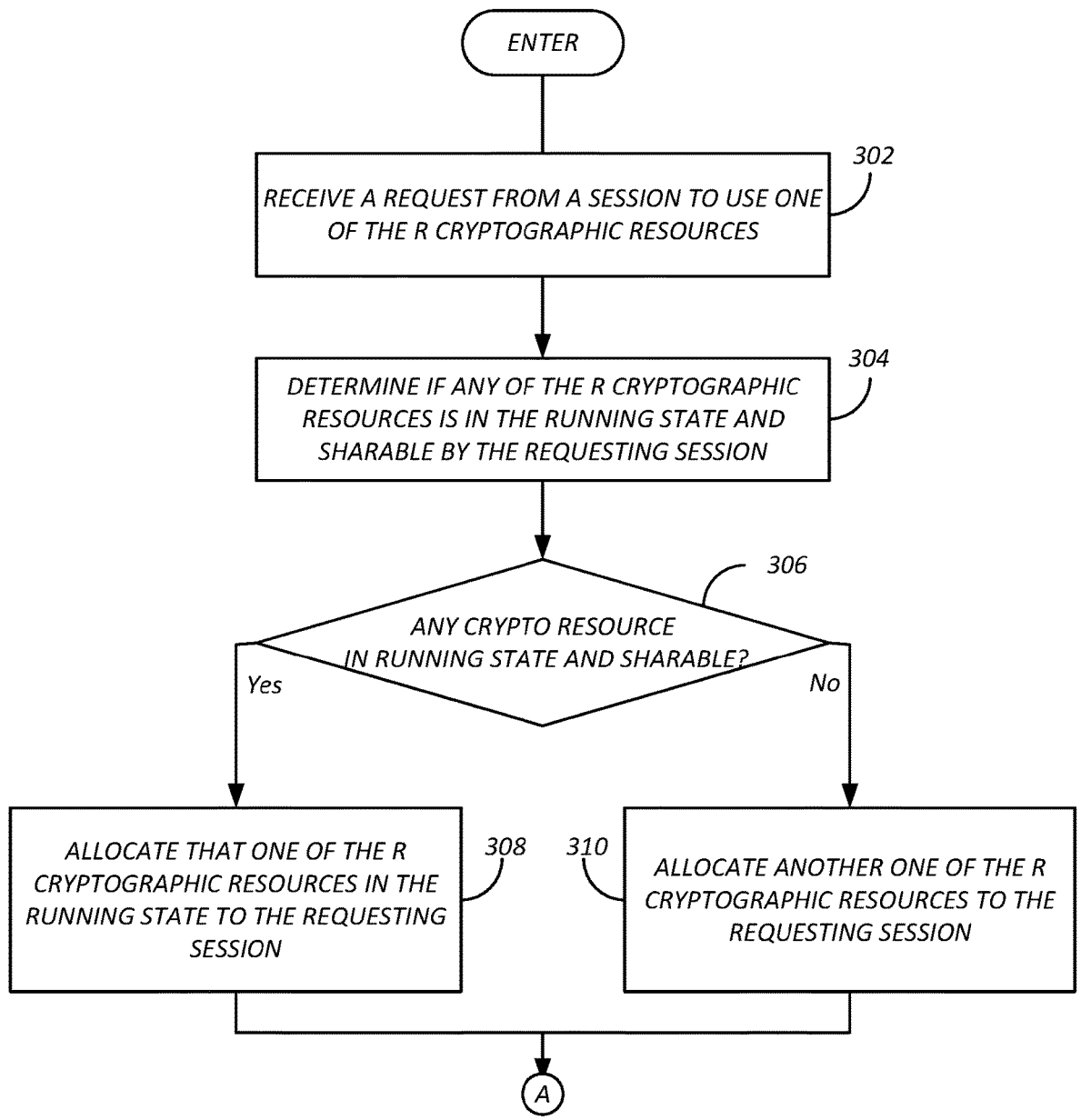
FIG. 3A is a flow chart depicting an exemplary technique for allocating a crypto resource to a session requesting use of a crypto resource.
Figure 3B:
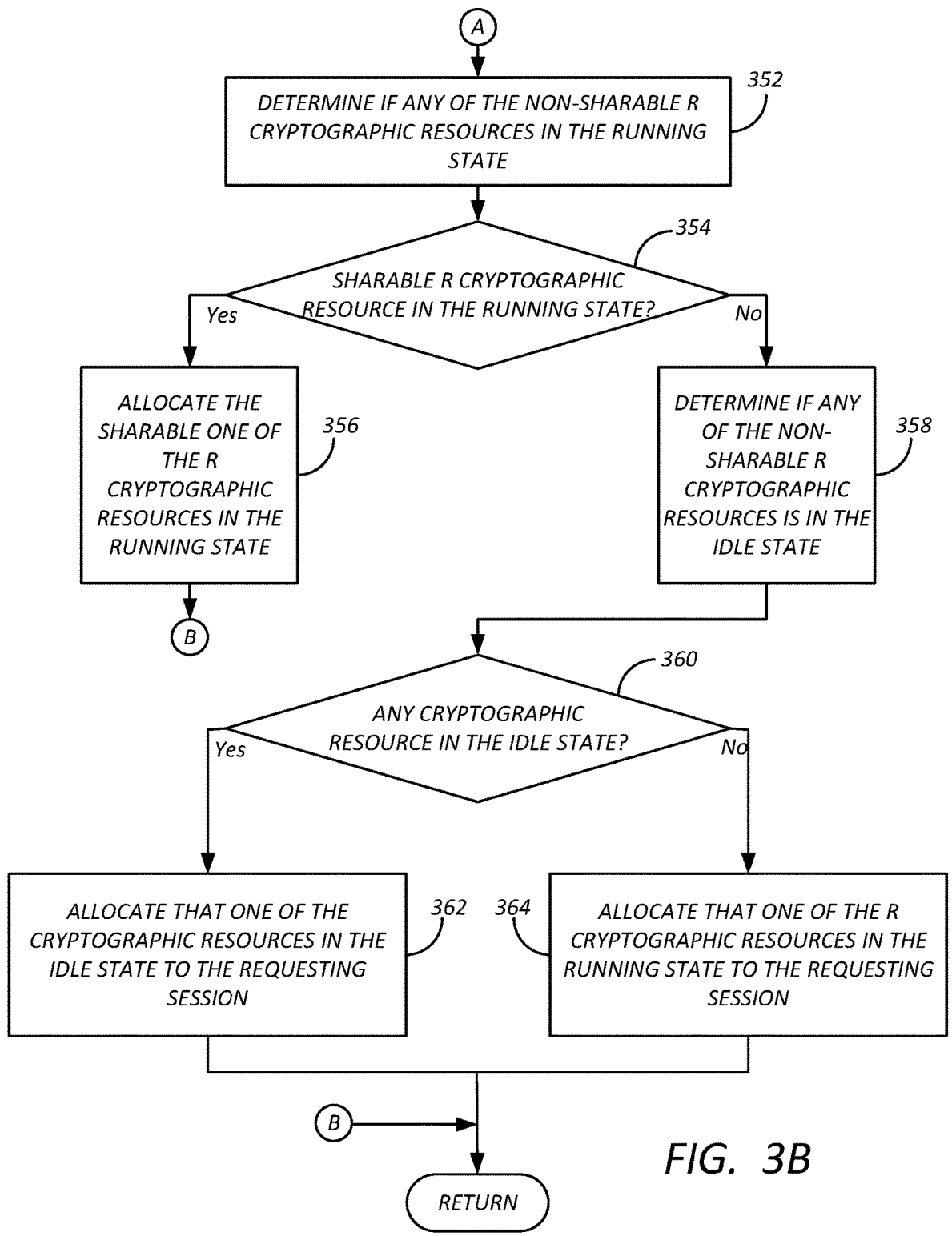
FIGS. 3B and 3C illustrate a case where there are four available crypto resources.

FIG. 3A is a flow chart depicting an exemplary technique for allocating a crypto resource 216 to a session requesting use of a crypto resource 216. FIG. 3B is another depiction of the exemplary technique wherein:
R=Number of available crypto resources=4; and
N=Number of sessions allowed to share a single one of the R crypto resources=2

In block 302, the TEE 220 receives a request from a session to use one of the R crypto resource 216. This request may have resulted, for example, by a command for the STB to change channels, thus selecting a media program for which a new decryption key is required.

Block 304 determines if any of the crypto resources 216 is in the running state and sharable by the requesting session. In one embodiment, one or more flags are set or data stored to indicate the state (e.g. running, idle, or dirty) of each crypto resource 216, and the state of the crypto resource 216 is determined by examining the status of the flag or data. Whether a crypto resource 216 is sharable by another session depends upon the task that is being performed by that crypto resource 216 and the task that is asked of it by the requesting session. If the crypto resource 216 can perform the task of the requesting session without negatively affecting the task already being performed by the crypto resource 216, then the crypto resource 216 is sharable by the requesting session. In the case of the crypto resource 216 comprising a key slot in which key generation information 214 is provided and used to derive a key used for cryptographic purposes, the crypto resource 216 is sharable if the requesting session provides the same key information 214 as session currently using the crypto resource 216. This can happen, for example, when a first session invokes first process using first key generation information 214 that is used to generate a first key for decrypting video content, and a subsequent second session invokes a second process using the same key information to generate the same key, but instead to decrypt the audio content associated with the video content.

Block 306 routes processing to block 308 if at least one of the crypto resources 216 is in the running state and is sharable by the requesting session, and to block 310 if there are no crypto resources 216 that are both in the running state and sharable. Block 308 allocates the sharable one of the running crypto resources 216 to the requesting session, and returns to further processing. Block 310 allocates another of the crypto resources 216 to the requesting session, and also returns to further processing.

FIG. 3B is a diagram illustrating exemplary operations to further allocate cryptographic resources to requesting sessions. The operations prioritize granting running resources to over granting idle resources to sessions, and gives lowest priority to granting dirty crypto resources 216 to requesting sessions. This is because running crypto resources are available for immediate or near immediate use with minimal processing, idle crypto resources require some processing and time to place them in the running state where they are ready for use, and dirty crypto resources require the most processing and take the longest to clean up to place them in the running state where they are available for use. If another one of the crypto resources 216 is in the running state but is not sharable, that crypto resource 216 is allocated to the requesting session. If none of the crypto resources 216 are in the running state, one of the idle or dirty crypto resources would need to be cleaned and set up for use by the requesting session.

Turning to FIG. 3B, block 352 determines if any of the non-sharable crypto resources 216 are in the running state. If so, block 354 directs processing to block 356, where the non-sharable crypto resource 216 in the running state, and processing returns to await further events. If not, block 354 directs processing to block 358, in which a determination is made whether any of the non-sharable crypto resources are in the idle state. If so, block 360 directs processing to block 362 which allocates the crypto resource in the idle state to the requesting session. The crypto resource will need to be started up and placed in the running state before use. If none of the available crypto resources are in the idle state (or the running state, as enforced by block 354), the requesting session is allocated a dirty crypto resource, or if no crypto resource is available, placed on a waiting list for the next available crypto resource, as shown in block 364.

Figure 3C:
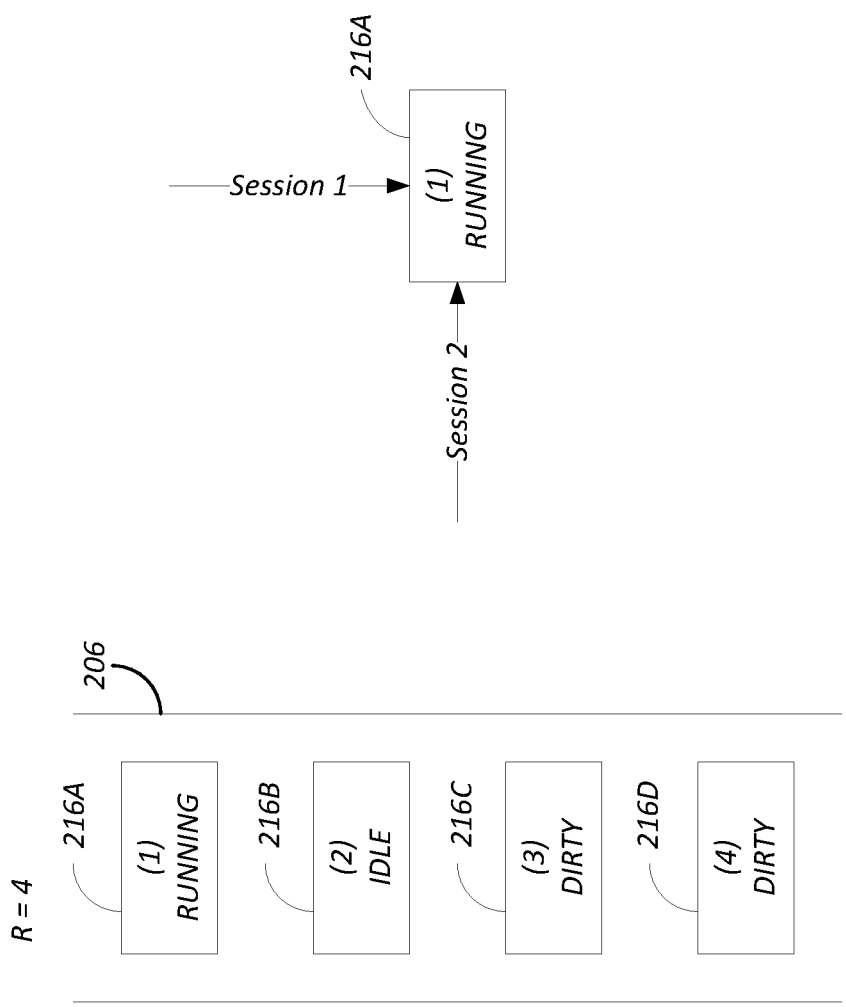

FIG. 3C illustrates the foregoing process in a case where there are R=4 available crypto resources 216, with crypto resource (1) 216A in the running state, crypto resource (2) 216B in the idle state, crypto resource (3) 216C in the dirty state, and crypto resource (4) 216N in the dirty state. As a result of the foregoing operations, when a session (Session 2) makes a request for a crypto resource 216, the crypto resources 216 are checked to determine if there is a crypto resource 216 that is both running and sharable by the requesting session. In the illustrated example only crypto resource 216A is both running (it is being used by Session 1) and sharable, so the requesting session is allocated that crypto resource 216, and the crypto resource is thereafter shared by the Session 1 and Session 2. If no sharable resource was available, Session 2 would have been allocated crypto resource (2) 216B, as it is in the idle state and more readily brought to the running state where it can be utilized.

Optimization of Crypto Resource Cleanup

Another aspect of the optimization of the use of cryptographic resources involves determining when crypto resources are no longer being used, and when to clean up and to start up the resources so they are available when needed. As described below, clean up and startup of crypto resources is accomplished in a time manner that does not affect the session set up and doesn't add any operational overhead in time. For a particular resource, after a maximum number of N shared sessions are terminated, the logic defers the cleanup of any used resources by marking then DIRTY. The logic then starts up a resource that is either in IDLE or RUNNING. This is done in parallel with setting up a session that would use this crypto resource, hence reducing the operation overhead of the resource clean up and setup process.

Figure 4A:
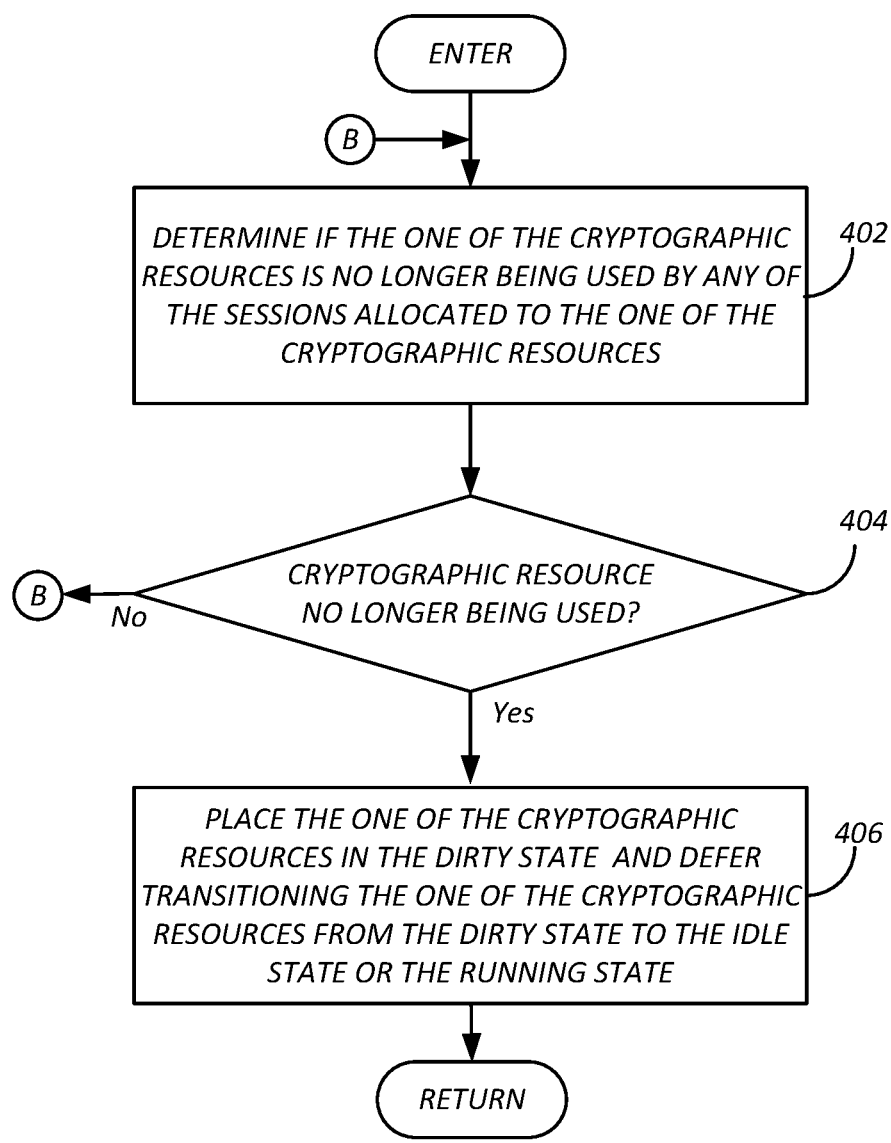
FIG. 4A is a diagram illustrating an exemplary embodiment of a process for preparing a crypto resource that is no longer used.

FIG. 4A is a diagram illustrating an exemplary embodiment of a process for preparing a crypto resource 216 that is no longer used so that the crypto resource can be cleaned up and transitioned to the running state so that it can be used by other sessions. Block 402 determines if the previously allocated cryptographic resource is no longer in use by any of the sessions to which it has been allocated. This can be determined, for example, by determining that the crypto resource 216 has not been used by any of the sessions to which the crypto resource has been allocated sessions for a period of time. For example, the memory or crypto block 212 associated with the crypto resource 216 may be examined to determine if it has been used (e.g. data read out of the memory or stored in the memory) during a the period of time. If no data has been read from or written to the memory 212, it may reasonably be determined that the crypto resource is no longer being used.

Block 404 routes processing according to the determination of block 402. If the crypto resource is still being used, processing is routed back to block 402 so that the use of the crypto resource is further monitored. If the crypto resource is no longer being used, processing is routed to block 406, which places the one of the crypto resources in the dirty state and defers transitioning of the cryptographic resource from the dirty state to the idle state or the running state until a later time. Since the cleanup of the crypto resource takes time and the performance of this task the deferral of the cleanup operations permits the system to address new crypto resource requests from sessions without delay, and improves performance.

Figure 4B:
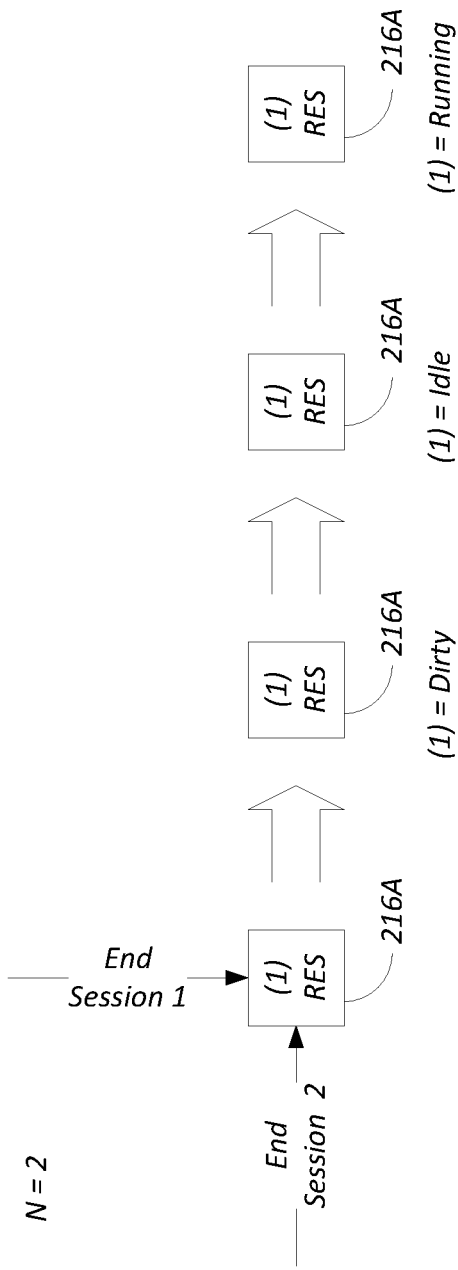
FIG. 4B is a diagram depicting the placement of the crypto resource in the dirty state.

FIG. 4B is a diagram depicting the placement of the crypto resource in the dirty state. As illustrated, when all of the sessions (e.g. Session 1 and Session 2) are ended or no longer need the crypto resource, the crypto resource 216 is transitioned to the dirty state. The crypto resource 216 is later transitioned to the idle state or to the idle state and then the running state as described further below.

Optimization of Crypto Resource Startup

Described below is a technique for identifying the crypto resource 216 that needs immediate reset or deferred reset by considering the number of shared sessions ($N_{thresh}$) of another one of the R crypto resources, and the time it takes to prepare and initialize a crypto resource. One such instance involves the scenario when a crypto resource has been shared by $N_{thresh}$ sessions for a time T. When such conditions are met, a DIRTY or IDLE crypto resource 216 is initialized for future usage. The method prioritizes DIRTY resources which requires a cleanup and startup. This reduces operational overhead when sessions are using available crypto resources.

Figure 5A:
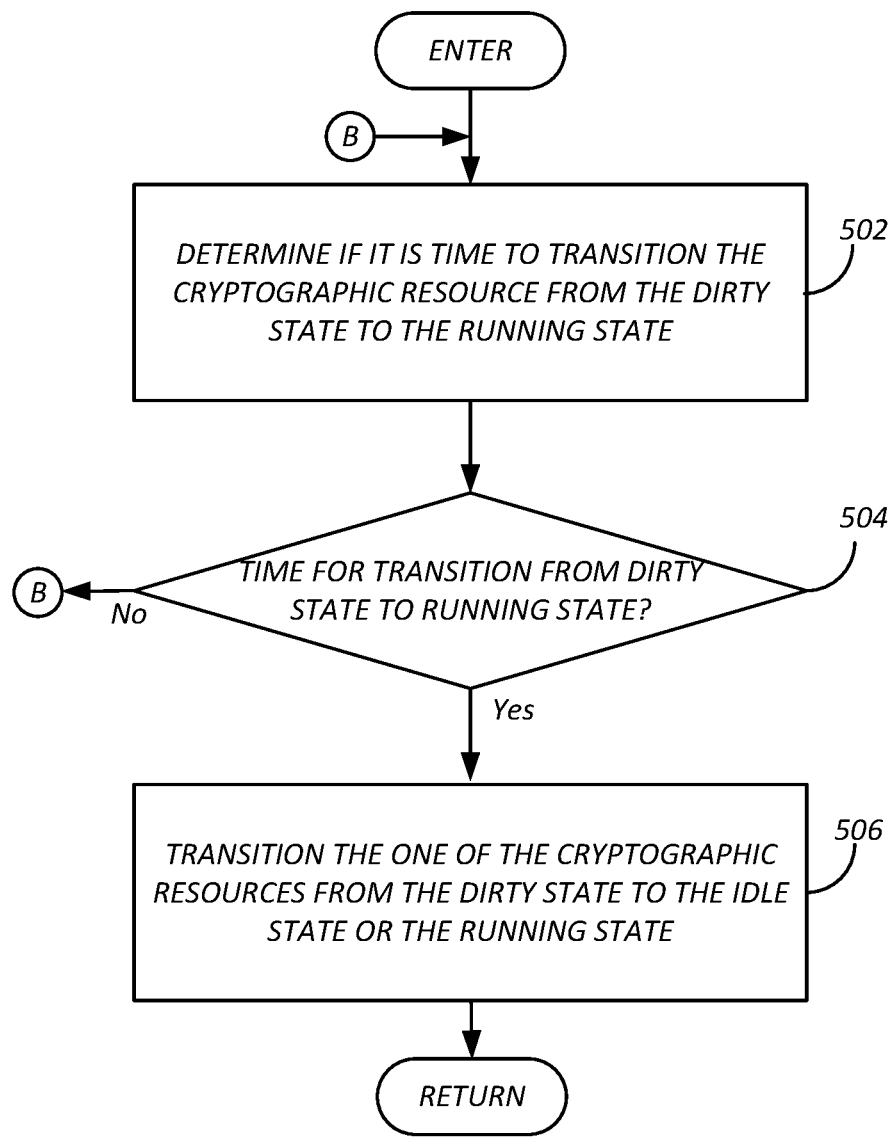
FIG. 5A is a diagram depicting exemplary operations used to transition a crypto resource from a dirty state to the idle state or the running state.

FIG. 5A is a diagram depicting exemplary operations used to transition a crypto resource from a dirty state to the idle state or the running state. In block 502, the logic determines if it is time to transition the crypto resource from the dirty state to another state (preferably, the running state). That the time has arrived for making this transition can be determined in a number of different ways. In one embodiment, when at least one of the other crypto resources (the crypto resources that were not formerly shared and now dirty) has been shared by a threshold number of sessions ($N_{thresh}$) for at least a time T without request for another of the R cryptographic resources, it is presumed that whatever session activity that prompted the need for the crypto resources (e.g. channel surfing) has ceased, and the time for cleaning the crypto resources has arrived.

If it is not time to transition the crypto resource 216 from the dirty state to the running state, processing is routed back to 502. If it is time to transition the crypto resource 216 from the dirty state to either the idle state or the running state block 504 routes processing to block 506, where the crypto resource is transitioned from the dirty state to the running state or the idle state.

In most cases, it is preferred to make the transition of the crypto resources from the dirty state to the idle state and finally to the running state rather than transitioning from the dirty state to the idle state and delaying the final transition to the running state. However, if it is estimated that the transition from the dirty state to the running state through the idle state will take long enough to delay further session requests, the transition from the dirty state to the idle state can be made, with the transition from the idle state to the running state deferred until another time (for example, again waiting until at least one of the crypto resources has been shared by $N_{thresh}$ sessions for at least time T without a further request for another of the R cryptographic resources. In this instance, the values of $N_{thresh}$ and/or T may be adjusted lower to account for the fact that the transition from the idle state to the running state is more readily and quickly accomplished.

Figure 5B:
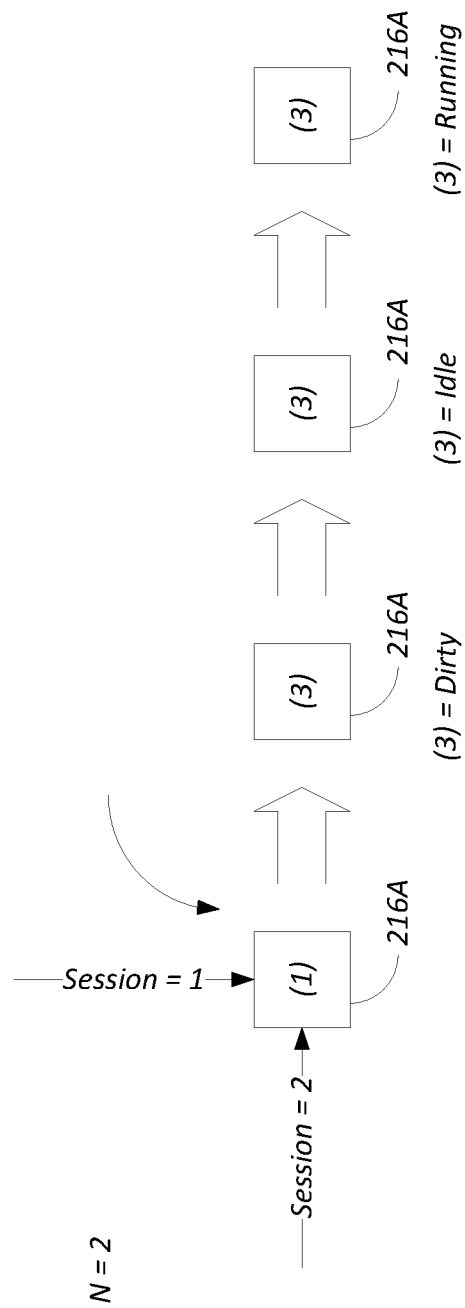
FIG. 5B is a diagram illustrating the transitioning of the state of the crypto resource from the dirty state to the running state.

FIG. 5B is a diagram illustrating the transitioning of the state of the crypto resource from the dirty state to the running state. In the illustrated example, crypto resource (1) 216A has been shared by at least $N_{thresh}=2$ resources for time T, so crypto resource (3) 216C is cleaned up (thus bringing the crypto resource 216C into the idle state) and started up (thus bringing the crypto resource 216C into the running state.

EXPERIMENTAL RESULTS

Tests measuring the processing delays experience when selecting channels were performed. These tests showed that using the foregoing technique processing delays were reduced to approximately 37% of such processing delays without optimization.

Hardware Environment

Figure 6:
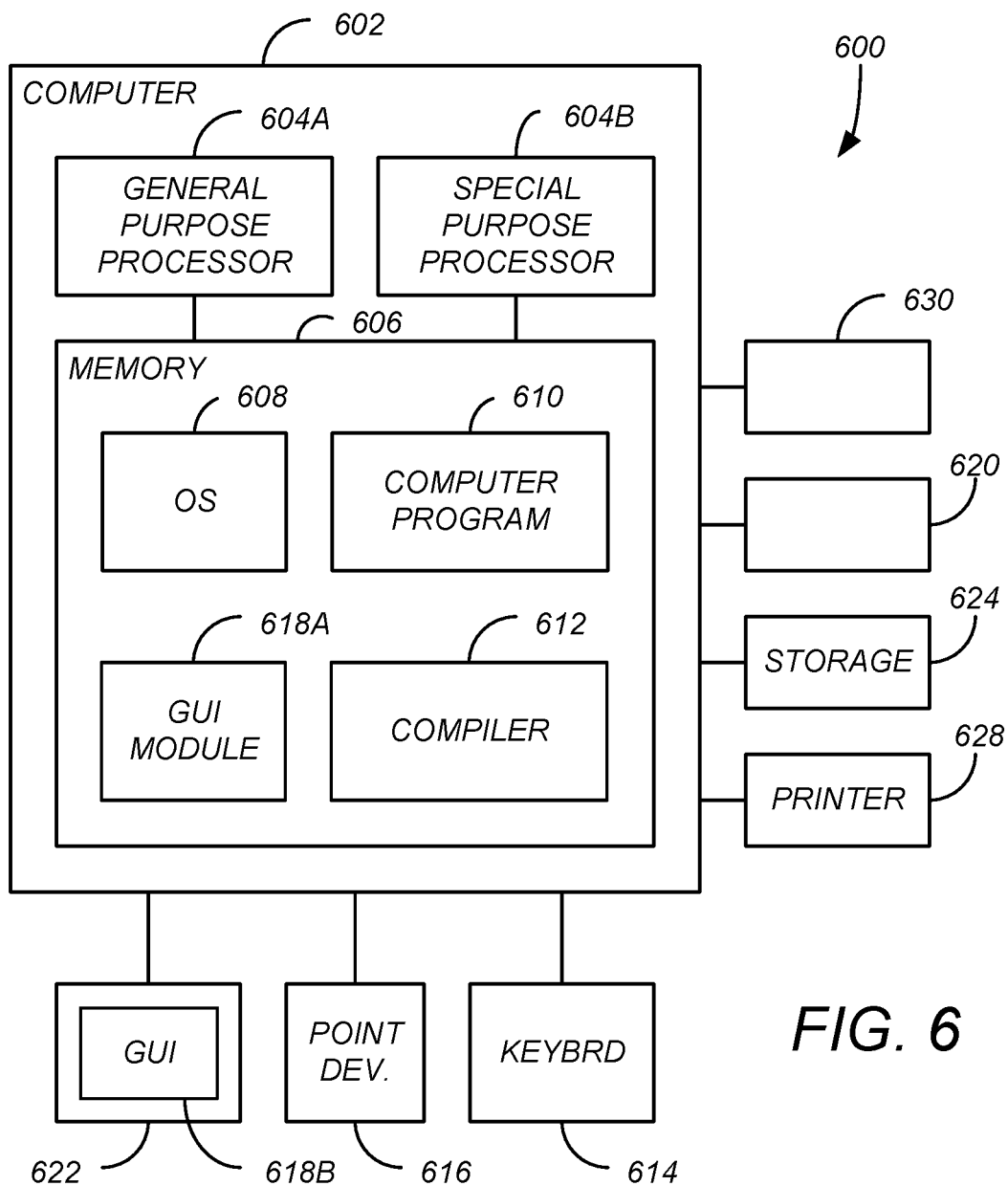
FIG. 6 illustrates an exemplary computer system or device that could be used to implement processing elements used to perform the foregoing operations.

FIG. 6 illustrates an exemplary computer system 600 that could be used to implement processing elements of the above disclosure, including the STBs 106 or processor 110. The system 600 includes a computer 602 that comprises a processor 604 and a memory, such as random access memory (RAM) 606. The computer 602 is operatively coupled to a display 622, which presents images such as windows to the user on a graphical user interface 618B. The computer 602 may be coupled to other devices, such as a keyboard 614, a mouse device 616, a printer 628, etc. Of course, those skilled in the art will recognize that any combination of the above components, or any number of different components, peripherals, and other devices, may be used with the computer 602.

Generally, the computer 602 operates under control of an operating system 608 stored in the memory 606, and interfaces with the user to accept inputs and commands and to present results through a graphical user interface (GUI) module 618A. Although the GUI module 618B is depicted as a separate module, the instructions performing the GUI functions can be resident or distributed in the operating system 608, the computer program 610, or implemented with special purpose memory and processors. The computer 602 also implements a compiler 612 which allows an application program 610 written in a programming language such as COBOL, C++, FORTRAN, or other language to be translated into processor 604 readable code. After completion, the application 610 accesses and manipulates data stored in the memory 606 of the computer 602 using the relationships and logic that was generated using the compiler 612. The computer 602 also optionally comprises an external communication device such as a modem, satellite link, Ethernet card, or other device for communicating with other computers.

In one embodiment, instructions implementing the operating system 608, the computer program 610, and the compiler 612 are tangibly embodied in a computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of instructions which, when read and executed by the computer 602, causes the computer 602 to perform the operations herein described. Computer program 610 and/or operating instructions may also be tangibly embodied in memory 606 and/or data communications devices 630, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of optimizing an allocation of R of cryptographic resources to a plurality of sessions, each of the R cryptographic resources shareable by no more than N sessions, wherein N>R, and each of the R cryptographic resources being characterized by one of an idle state, a running state and a dirty state, the method comprising:
   receiving a request from one of the plurality of sessions to use one of the R cryptographic resources;
   determining if any of the R cryptographic resources is in the running state and sharable by the requesting session;
   if any of the R cryptographic resources is in the running state and sharable by the requesting session, allocating that one of the R cryptographic resources in the running state to the requesting session; and
   if none of R cryptographic resources is in the running state and sharable by the requesting session, allocating another one of the R cryptographic resources to the requesting session.

2. The method of claim 1, wherein
   the request comprises key generation information; and
   determining if any of the R cryptographic resources is in the running state and sharable by the requesting session comprises:
      determining if any of the R cryptographic resources was allocated with the key generation information.

3. The method of claim 1, wherein allocating another one of the R cryptographic resources to the one of the N sessions comprises:
   determining if one of the R cryptographic resources is in the running state;
   if one of the R cryptographic resources is in the running state and not sharable by the requesting session, allocating the one of the R cryptographic resources in the running state to the requesting session;
   if none of the R cryptographic resources is in the running state:
      determining if one of the R cryptographic resources is in the idle state;
         if the one of the R cryptographic resources is in the idle state, allocating that one of the R cryptographic resources in the idle state to the requesting session; and
         if none of the R cryptographic resources is in the idle state, allocating one of the R cryptographic resources in the dirty state to the requesting session.

4. The method of claim 3, further comprising:
   determining if the one of the cryptographic resources in the running state is no longer being used by any of the N sessions allocated to the one of the cryptographic resources; and
   if the one of the cryptographic resources in the running state is no longer being used by any of the N sessions allocated to the one of the cryptographic resources, placing the one of the cryptographic resources in the dirty state and deferring transitioning the one of the cryptographic resources from the dirty state to the idle state or the running state.

5. The method of claim 4, wherein:
   determining if the one of the cryptographic resources in the running state is no longer being used by any of the N sessions allocated to the one of the cryptographic resources comprises:
   determining that the one of the cryptographic resources has not been used by any of the N sessions allocated to the one of the R cryptographic for a period of time.

6. The method of claim 5, further comprising:
   determining that the one of the cryptographic resources is to be transitioned from the dirty state to the idle state or from the dirty state to the running state; and
   transitioning the one of the cryptographic resources from the dirty state to the idle state or from the dirty state to the running state.

7. The method of claim 6, wherein the transitioning the one of the cryptographic resources from the dirty state to the idle state or from the dirty state to the running state is deferred until at least another one of the R cryptographic resources has been shared by $N_{thresh}$ sessions for at least time T without a further request for the another one of the R cryptographic resources.

8. The method of claim 6, wherein:
   the transitioning of the one of the cryptographic resources from the dirty state to the idle state and from the idle state to the running state prioritizes transitioning from the dirty state to the running state over transitioning from the dirty state to the idle state and from the idle state to the running state.

9. The method of claim 8, wherein
   transitioning from the dirty state to the idle state comprises cleaning up the one of the crypto resources; and
   transitioning from the idle state to the running state comprises starting up the one of the crypto resources.

10. An apparatus for optimizing an allocation of R of cryptographic resources to a plurality of sessions, each of the R cryptographic resources shareable by no more than N sessions, wherein N>R, and each of the R cryptographic resources being characterized by one of an idle state, a running state and a dirty state, comprising:
   a processor;
   a memory, the memory storing processor instructions comprising processor instructions for
      receiving a request from one of the plurality of sessions to use one of the R cryptographic resources;
      determining if any of the R cryptographic resources is in the running state and sharable by the requesting session;
      if any of the R cryptographic resources is in the running state and sharable by the requesting session, allocating that one of the R cryptographic resources in the running state to the requesting session; and if none of R cryptographic resources is in the running state and sharable by the requesting session, allocating another one of the R cryptographic resources to the requesting session.

11. The apparatus of claim 10, wherein the request comprises key generation information; and the processor instructions for determining if any of the R cryptographic resources is in the running state and sharable by the requesting session comprises processor instructions for:

determining if any of the R cryptographic resources was allocated with the key generation information.

12. The apparatus of claim 10, wherein the processor instructions for allocating another one of the R cryptographic resources to the one of the N sessions comprises processor instructions for:

determining if one of the R cryptographic resources is in the running state;

if one of the R cryptographic resources is in the running state and not sharable by the requesting session, allocating the one of the R cryptographic resources in the running state to the requesting session;

if none of the R cryptographic resources is in the running state:

determining if one of the R cryptographic resources is in the idle state;

if the one of the R cryptographic resources is in the idle state, allocating that one of the R cryptographic resources in the idle state to the requesting session; and if none of the R cryptographic resources is in the idle state, allocating one of the R cryptographic resources in the dirty state to the requesting session.

13. The apparatus of claim 12, wherein the processor instructions further comprise processor instructions for:

determining if the one of the cryptographic resources in the running state is no longer being used by any of the N sessions allocated to the one of the cryptographic resources; and if the one of the cryptographic resources in the running state is no longer being used by any of the N sessions allocated to the one of the cryptographic resources, placing the one of the cryptographic resources in the dirty state and deferring transitioning the one of the cryptographic resources from the dirty state to the idle state or the running state.

14. The apparatus of claim 13, wherein the processor instructions further comprise processor instructions for:

determining if the one of the cryptographic resources in the running state is no longer being used by any of the N sessions allocated to the one of the cryptographic resources comprises processor instructions for:

determining that the one of the cryptographic resources has not been used by any of the N sessions allocated to the one of the R cryptographic for a period of time.

15. The apparatus of claim 14, wherein the processor instructions further comprise processor instructions for:

determining that the one of the cryptographic resources is to be transitioned from the dirty state to the idle state or from the dirty state to the running state; and transitioning the one of the cryptographic resources from the dirty state to the idle state or from the dirty state to the running state.

16. The apparatus of claim 15, wherein the processor instructions defer transition the one of the cryptographic resources from the dirty state to the idle state or from the dirty state to the running state is until at least another one of the R cryptographic resources has been shared by $N_{thresh}$ sessions for at least time T without a further request for the another one of the R cryptographic resources.

17. The apparatus of claim 15, wherein:

the processor instructions prioritize transitioning from the dirty state to the running state over transitioning from the dirty state to the idle state and from the idle state to the running state.

18. The apparatus of claim 17, wherein the processor instructions for transitioning from the dirty state to the idle state comprise processor instructions for cleaning up the one of the crypto resources; and the processor instructions for transitioning from the idle state to the running state comprise processor instructions for starting up the one of the crypto resources.

19. The apparatus of claim 10, wherein:

the processor is a secure processor;

each cryptographic resource comprises:

a key slot; and a memory associated with the key slot.

20. An apparatus for optimizing an allocation of R of cryptographic resources to a plurality of sessions, each of the R cryptographic resources shareable by no more than N sessions, wherein N>R, and each of the R cryptographic resources being characterized by one of an idle state, a running state and a dirty state, comprising:

means for receiving a request from one of the plurality of sessions to use one of the R cryptographic resources;

means for determining if any of the R cryptographic resources is in the running state and sharable by the requesting session;

means for allocating that one of the R cryptographic resources in the running state to the requesting session if any of the R cryptographic resources is in the running state and sharable by the requesting session; and means for allocating another one of the R cryptographic resources to the requesting session if none of R cryptographic resources is in the running state and sharable by the requesting session.

* * * * *